July 14, 1970     D. D. TAYLOR     3,520,544

Y-RING SEAL

Original Filed May 27, 1966     2 Sheets-Sheet 1

Inventor:
Dudley D. Taylor
By Henry H. Smelling
his Attorney

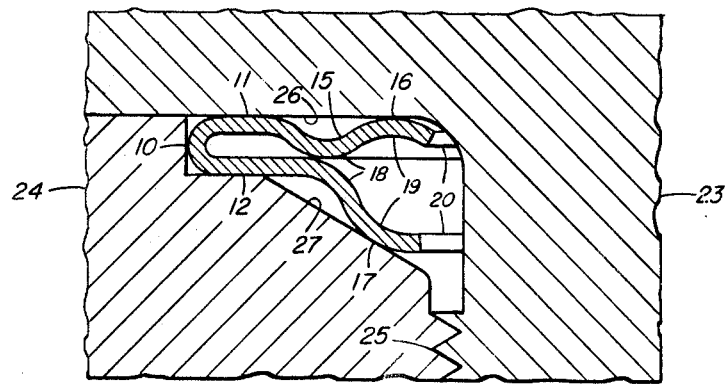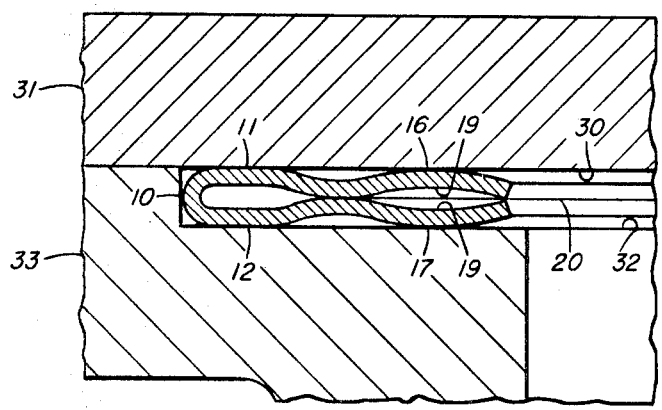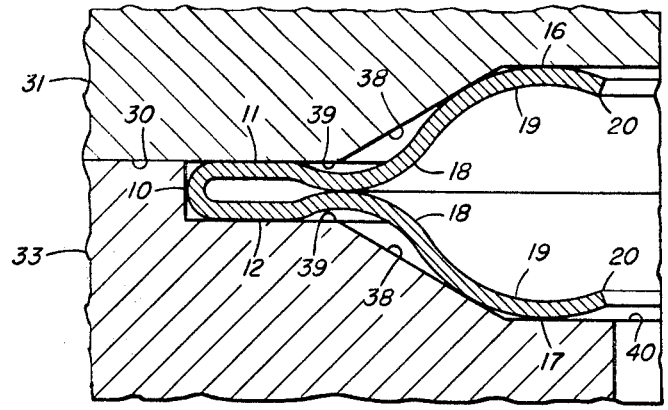

United States Patent Office 3,520,544
Patented July 14, 1970

3,520,544
Y-RING SEAL
Dudley D. Taylor, Greenbelt, Md., assignor to Pressure Science, Inc., Beltsville, Md., a corporation of Maryland
Continuation of application Ser. No. 553,361, May 27, 1966. This application Nov. 6, 1968, Ser. No. 774,603
Int. Cl. F16j 15/08
U.S. Cl. 277—206                                    2 Claims

ABSTRACT OF THE DISCLOSURE

A one-piece sealing ring of approximate Y-shape in radial section is disclosed. The arms of the Y include inwardly facing concave portions and outwardly facing concave portions, each arm of the Y projecting inwardly from parallel portions forming the stem of the Y. An internal line contact is formed in the seal when the seal is stressed.

This is a continuation of application Ser. No. 553,361, filed May 27, 1966, and now abandoned.

This invention relates to sealing rings and has for its principal object the provision of a special purpose seal which is initially symmetrical with respect to a central plane, thereby eliminating any possibility of an incorrect installation, thus the seal can be installed with either side face up in a wide variety of symmetrical and non-symmetrical cavities as for example the one between a union fitting and the boss with which it has a threaded connection.

Another object of the invention is to provide a seal suitable for use at temperatures from minus 420° to 2000° F. and to hold pressures from vacuum to 20,000 p.s.i., which extremes make conventional elastomeric seals impracticable.

A further object of the invention is to provide a seal with a Y-shape radial section, in which the stem of the Y is formed in part by a 180° bend of the metal of the sealing ring. Beside this 180° bend the sealing ring has as part of the stem of the Y proximate each arm a reverse bend which acts to cancel stress at the outside diameter of the ring, this giving the seal the property of functioning nicely in a wide variety of cavity shapes, including those in which the cavity deflects upon repeatedly applied pressures and temperatures. When installed, the seal is compressed until an internal line contact is created, the force to do this being low but increasing at a rapid rate after the initial line contact is created. The design of the seal eliminates high bending stresses due to the applied pressure or deflection of the sealing surfaces, thus insuring a long fatigue life.

Additional features of the new seal include (a) it can be used at high pressures with or without mechanical support on the outside diameter, i.e., the bottom of the stem of the Y. This pressure depends upon and is a function of the cavity shape and the overall diameter of the seal; and since a seal receives its final set in its appointed cavity, the latter may be designed with large tolerances; (b) it can be made from a wide variety of materials, including metals and some of the newer plastics, including nylon and Teflon although 304 stainless steel or Inconel X is preferred since the seal preferably is fashioned from a blank similar in shape to a napkin ring and when of Inconel X or stainless steel 304 as preferred; (c) it can be made at low cost by using well known metal forming techniques; (d) it can be coated with silver, gold or other low yield strength material, this assuring adequate sealing on rough surface finishes and because of low contact stresses eliminating fretting corrosion problems; (e) the seal clearly shows by casual inspection whether or not it has been used for once used it is no longer symmetrical but the seal can be used repeatedly in the same cavity; (f) it is a line contact seal and does provide high contact stresses between the sealing surfaces to such an extent that these Y rings are helium tight; and (g) there is no damage to the sealing surfaces and one may install a steel Y-ring in an aluminum cavity without using a soft coating, carry the pressure to 20,000 p.s.i., disassemble and examine without being able to detect distortion of the aluminum surface.

In the drawings:

FIGS. 5, 6 and 7 are identical with FIGS. 2, 3 and 4 with the addition in each case of mechanical support for the outside diameter of the seal.

Figure 1:
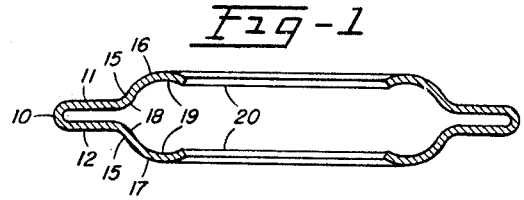
FIG. 1 is a section through a seal before installation.

In FIG. 1 the seal is shown in its initial commercial shape, being from a blank resembling a napkin ring, usually cylindrical but may be of other shapes such as elliptical. The blank is expanded or pushed out centrally to create a 180° bend 10 which becomes the outside diameter of the seal which has a radial configuration explaining the commercial title of the seal—Y-Ring. In addition to the bend 10, the stem of the Y includes two straight portions 11 and 12 slightly spaced apart and parallel and also an important reverse bend 15 integral with each of the arms 16 and 17, each of which bends has an inwardly facing convex portion 18 and an outwardly facing concave portion 19. As shown in FIG. 1, each of the arms 16 and 17 project inwardly from each of the parallel portions 11 and 12 and join the respective parallel portions at an obtuse angle with the arms. The ends 20 of the arms are spaced apart a distance somewhat less than the greatest distance apart of the concave portions 19 of the curved arms.

Figure 2:
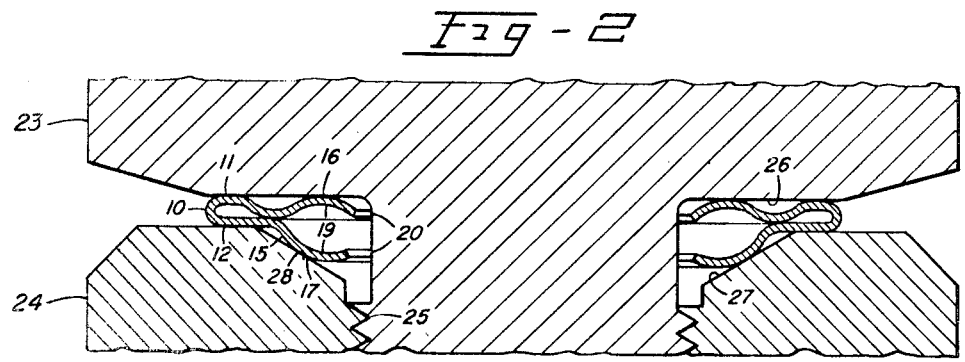
FIG. 2 is a central section through a seal fitted between a housing and a threaded plug. In this well-known use there is no support for the outside diameter of the ring as none is needed.

In FIG. 2 the seal is fitted between a plug 23 and a member 24 which may be a boss extending from a housing. The two members are threaded together as at 25 as for example when the plug is an 815 union fitting and the portion shown is the central octagonal flange by which the fitting is screwed into place. The plug 23, whether solid or a union fitting, would have a plane surface 26 engaging arm 16 and the member 24 has a conical surface 27 engaging the opposite arm 17 of the sealing ring. As the plug is screwed in place the ends 20 of the seal approach each other, the line contact at 28 becoming, if the pressure is sufficiently great, an area contact.

Figure 3:
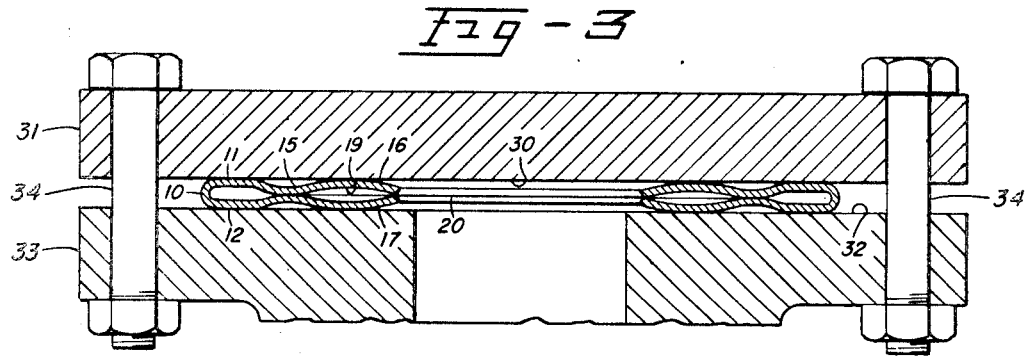
FIG. 3 is a central section through a seal fitted between a cover plate and a pipe flange to which the cover plate is bolted. The seal is compressed between two parallel planes and is not supported around its outside diameter.

In the simpler form of FIG. 3 both surfaces are plane, 30 being the bottom surface of a cover plate 31, and 32 being the top face of a pipe flange 33, the parts being secured together by the bolts 34. Here the reverse bends 15 are in contact and the curved arms 16 and 17, also the straight portions, are in firm contact with the plane surfaces.

Figure 4:
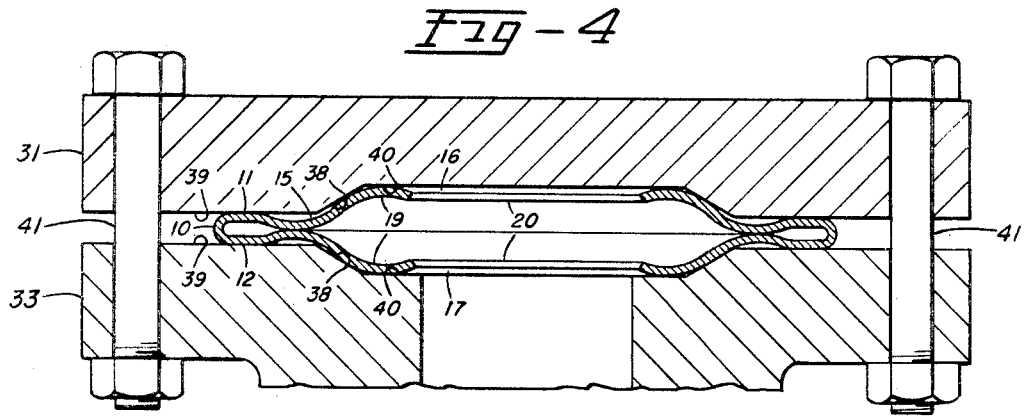
FIG. 4 is a central section through a seal fitted between a cover plate and a pipe flange and shows sealing between two conical surfaces, each having a plane surface on each side of the conical surface and the seal is without outside diameter support.

FIG. 4 shows parts similar to those of FIG. 3 but each member instead of having plane faces has a conical surface 38 between plane surfaces 39 and 40. Here again tightening the bolts 41 further brings the line contacts into area contacts. It will be noted that whether the outside diameter is supported or not it is immaterial whether arm 16 or arm 17 is uppermost.

The stress is cancelled at the outside diameter as the pressure tends to compress the parallel straight portions 12 and 12 but on each side and therefore these stresses cancel at the bottom of the stem of the Y.

The sections shown in FIGS. 5 to 7 are for higher pressures than those where the central bends are unsupported but the function is about the same. Best results are achieved when the initial pressures between the seal and the sealing surfaces are roughly twice the yield strength of the weakest member of the system, without considering the soft metal coating. Even with small sizes it is quite easy to tell whether or not a seal has been used, for the flattening of at least one side can readily be detected by a superficial examination.

The rings are supplied in over-all diameters of from .65″ to 2.8″ with inside diameters from .45″ to 2.53″ and a thickness at the outside of the straight portions either of .25″ or .38″ depending on the overall diameter, while the corresponding over-all thickness of the seals at the arms is either .08″ or .20″. The seals are used largely in "AND 10050 port connections."

The methods of manufacture are functions of the size and the material of the sealing ring. A metal sealing ring is machined or formed using conventional machines whereas a plastic ring is molded. The best method of manufacture is to die press to form two identical metal washers having the desired diameters and then fusion-weld the two washers together around their outside diameters as is standard with the welded bellows industry. Naturally secondary operations such as annealing and heat treatment are required to obtain finished seals.

It will be understood that one such sealing ring may be used in which the ring is of metal and of one piece and of approximately Y-shape in radial section and which has an over-all width of the ring at the arms of about three times the over-all width at the parallel portion, provided the stem of the Y comprises a 180° bend and two parallel portions, each arm of the Y being convex outwardly and concave inwardly and there is a reverse bend between each arm and the adjacent parallel portion.

It will also be understood that one such sealing ring may be used in which the ring has a thickness roughly equal to the initial inside distance between the parallel portions and the arms are arcuate extending at least 90° provided the ring is of metal and of one piece and of approximately Y shape in radial section, the stem of the Y comprising a 100° bend and two parallel portions, each arm of the Y being convex outwardly and concave inwardly, there being a reverse bend between each arm and the adjacent parallel portion.

I claim:
1. In combination with a pair of adjustable compression members which define a cavity in which high pressures are encountered, a sealing ring comprising a one-piece sealing ring of approximate Y-shape in radial section and having a stem and arms extending inwardly from the stem, said stem of the Y comprising a 180° bend and two spaced parallel portions contacting each other at their inner ends and providing a first cavity, each arm of the Y being convex outwardly and concave inwardly; each of said arms projecting inwardly from each of said parallel portions and joining said respective parallel portions at an obtuse angle with respect to the exterior face of said sealing ring, said arms being in opposed facing relationship to each other, the space between the two arms of the Y being clear, said arms terminating respectively at spaced apart tips such that planes tangent to said tips intersect to form an angle significantly less than 180° and forming a second cavity, said adjustable members compressing said seal and creating an internal line contact in said seal.

2. The combination of claim 1 in which the sealing ring is of metal and is initially symmetrical with respect to a central plane passing through both 180° bends and wherein the overall width of the sealing ring at the arms is about three times the overall width at the parallel portions.

References Cited
UNITED STATES PATENTS

| | | | |
|---|---|---|---|
| 1,236,816 | 8/1917 | Behan | 277—206 X |
| 1,926,107 | 9/1933 | Morehead | 277—206 X |
| 2,422,009 | 6/1947 | Goetze | 277—236 X |

FOREIGN PATENTS

| | | |
|---|---|---|
| 712,786 | 7/1954 | Great Britain. |

LAVERNE D. GEIGER, Primary Examiner

J. S. MEDNICK, Assistant Examiner

U.S. Cl. X.R.

277—236